United States Patent [19]

Walchhutter

[11] 4,285,669
[45] Aug. 25, 1981

[54] ROLLER KILN PROVIDED WITH A DRYING TUNNEL, PARTICULARLY FOR CERAMIC OR REFRACTORY MATERIALS

[76] Inventor: Ulrico Walchhutter, Via Accademia 39, Milan, Italy

[21] Appl. No.: 96,579

[22] Filed: Nov. 21, 1979

[30] Foreign Application Priority Data

Nov. 23, 1978 [IT] Italy ................................ 30090 A/78

[51] Int. Cl.³ ...................... F27D 15/02; F27B 3/04; F26B 19/00
[52] U.S. Cl. ......................................... 432/82; 34/216; 34/217; 432/145; 432/168; 432/176; 432/179
[58] Field of Search ...................... 432/59, 82, 83, 137, 432/145, 168, 169, 176, 177, 178, 179, 163, 164; 34/216, 217

[56] References Cited
U.S. PATENT DOCUMENTS 1,867,772  7/1932  Smalley ................................. 432/82
2,100,222  11/1937  McFarland ............................ 432/82

*Primary Examiner*—John J. Camby
*Attorney, Agent, or Firm*—Michael J. Striker

[57] ABSTRACT

A roller tunnel kiln for firing a drying refractory material advanced along the refractory rotatable rollers includes an upper section comprising a prefiring zone, a firing zone, a first forced cooling zone, a natural cooling zone and a second forced cooling zone. Parallel to the upper section along the length thereof a drying zone is arranged provided with refractory rotatable rollers for advancing movement of the material to be dried. A distributional tunnel is mounted parallel to the drying zone and is connected with the prekiln zone or with the forced cooling zone so that hot gases mixed with cool ambient air are directed into the distributing tunnel provided with openings communicating the latter with the drying zone. The hot gases at drying temperatures are further directed into drying tunnel in the direction opposite to that of the material to be dried.

19 Claims, 6 Drawing Figures

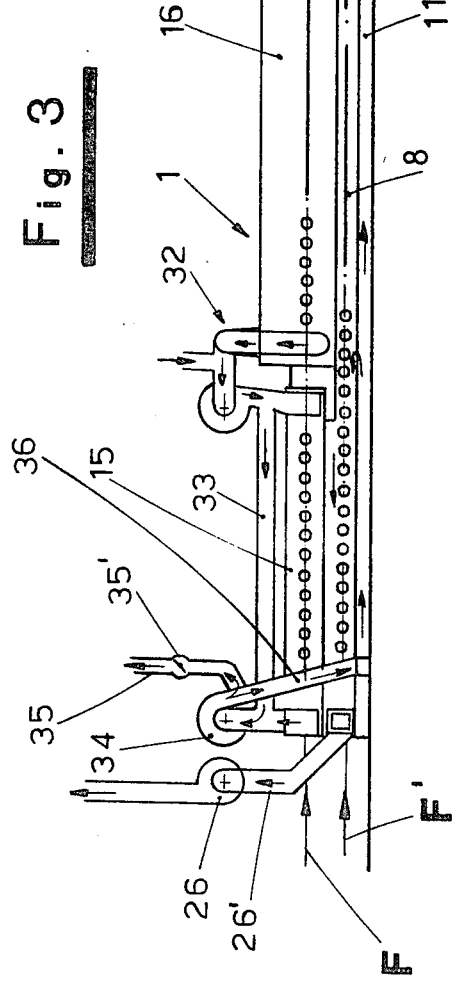
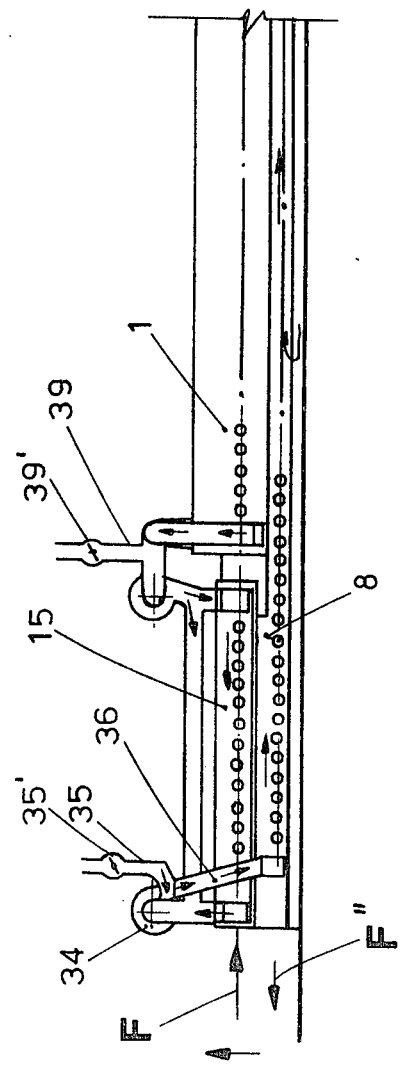

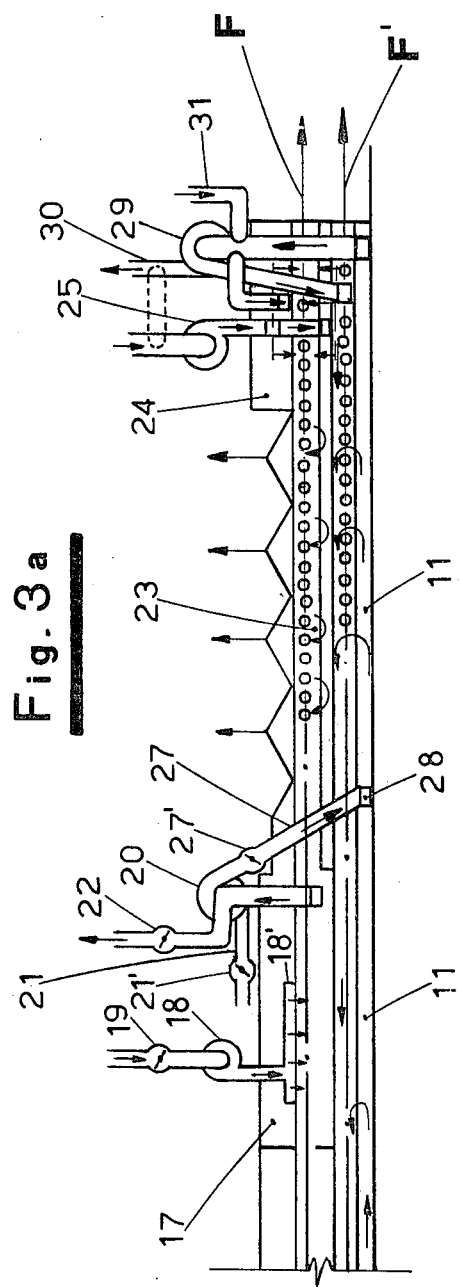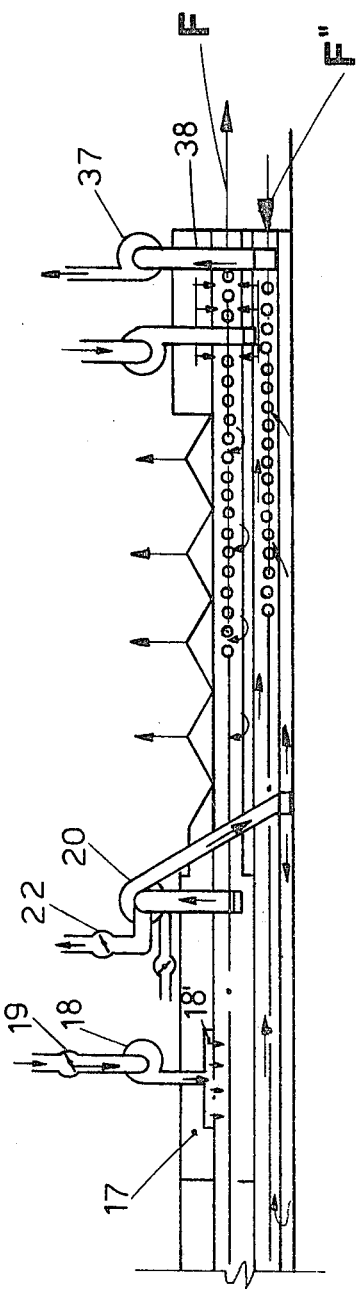

ROLLER KILN PROVIDED WITH A DRYING TUNNEL, PARTICULARLY FOR CERAMIC OR REFRACTORY MATERIALS

BACKGROUND OF THE INVENTION

In processes for the production of ceramic or refractory materials, such as tiles or the like, a drying step executed with suitable systems is notoriously included. The drying step is single for the tiles called "mono-firing", that is those materials which, after the pressing, are glazed and then baken, while it is repeated twice for the materials which afterwards are subject to a first firing to form the biscuit, then are glazed and at last are subject to a second drying step to dry the glaze and then are submitted again to a firing.

The drying, according to the traditional methods, shows disadvantages of production, installation cost, energy waste and encumbrance in the production lines.

The traditional quick driers condition the production line, so as to impose a very limited number of tile sizes, therefore different production lines are necessary to produce materials of different size and thickness, for this reason the number of production lines is often in excess with respect to the whole production of the ceramic factory.

Another disadvantage of the traditional quick driers is due to the fact that they request an enormous waste of energy that, sometimes, exceeds the 50% of the energy necessary for the firing of the same materials, also with reference to the most advanced kilns showing the best efficiency. This is due not only to the heat necessary for the drying, but also to the heat lost during the cyclic heating and cooling of the supporting structure of the same driers, besides the fact that an enormous percentage of heat is lost at the flue gas discharge.

A further drawback was caused by the encumbrances of the same driers, as well as by their remarkable cost; said encumbrances could extend both in the horizontal and vertical direction and therefore requested an excess of the shed sizing both in plan and height.

This invention tends to eliminate said disadvantages.

Said invention in fact proposes a drying installation combined with a roller kiln and developing along the same kiln, preferably below the tunnel of the proper kiln, constituting a second tunnel, suitably heated, through which the material is dried for being afterwards introduced into the firing kiln.

The savings in encumbrance, installation cost, energy and flexibility in the production of different sizes and thicknesses is enormous relative to the traditional installations.

SUMMARY OF THE INVENTION

The object of said invention is a roller kiln of the kind wherein a firing tunnel is provided with a progress plane constituted by a series of parallel refractory rollers singularly driven in rotation, and directed transversally to the kiln axis, characterized by the fact that it presents, parallelly to the firing tunnel, a second tunnel thermally separated from the first tunnel, along said second tunnel flowing a current of hot gases at the normal drying temperatures, said second tunnel being also provided with a progress plane for the ceramic materials, means being provided to feed into the drying tunnel at least a portion of the hot gases vented from the firing tunnel.

The drying tunnel is preferably positioned below the firing tunnel as the empty space due to the supporting structure may be occupied. This preferred embodiment does not prevent, however, that the tunnel can be positioned above the same kiln.

The fact that the drying tunnel operates with very low operative temperatures (150° to 250° C.), does not present problems of insulation and refractory material employ.

Consequently the progress plane of the material to be dried may be embodied by juxtaposed rotatable rollers, produced with a material less valuable than the firing kilns This allows for example to employ less valuable iron rollers which are inexpensive and mechanically resistant.

The same operative temperature limitation allows also to embody the progress plane in the form of a continuous conveyor, even though this embodiment is not the preferred one.

The progress plane can be also provided in a way that the material to be dried runs through the drying tunnel in the same direction or in the opposed direction with respect to the progress of the material into the firing tunnel.

In a characteristic and preferred embodiment of said invention, parallelly to the drying tunnel, a conduit is provided being in communication with the drying tunnel through a suitably bored partition wall, along said conduit hot gases can be conveyed, in order to be distributed along the drying tunnel to obtain a temperature diagram adequate to the type of the material to be dried.

In this way it is obtained a drying and firing unit strongly reducing the energy waste, as it allows to regenerate the heat of the gases coming out from the firing kiln, which gases sometimes carry about the 50% of the heat fed to the firing kiln, and also it allows to employ said gases for the drying, eliminating the separated heating installation already used in the known driers and reducing thereby in a drastic way the energy waste.

Secondly it is obtained a drying unit, wherein the portion inherent to drying can be mounted at a cost considerably lower than the cost of the most economical and traditional driers, as well as the encumbrance is strongly reduced as the space firstly occupied by the driers is completely annulled.

Another considerable advantage consists in that the driers combined with the roller kiln acquire the same flexibility with respect to the shape and thickness of the treated materials, and consequently the unit can be inserted in a production line destined to the production of materials of different shapes and thicknesses, strongly reducing thereby the installation expenses and the number of the production lines, and acquiring considerable economical advantages.

The foregoing and other additional objects of this invention will become apparent when referring to the preferred embodiments of the invention, as shown in the accompanying drawings.

BRIEF DESCRIPTION OF THE DRAWINGS

FIGS. 3 and 3a show respectively the initial portion and the final portion of a firing and drying kiln in a first preferred embodiment;

FIGS. 4 and 4a show respectively the initial portion and the final portion of the kiln in a second preferred embodiment.

DESCRIPTION OF THE PREFERRED EMBODIMENTS

Figure 1:
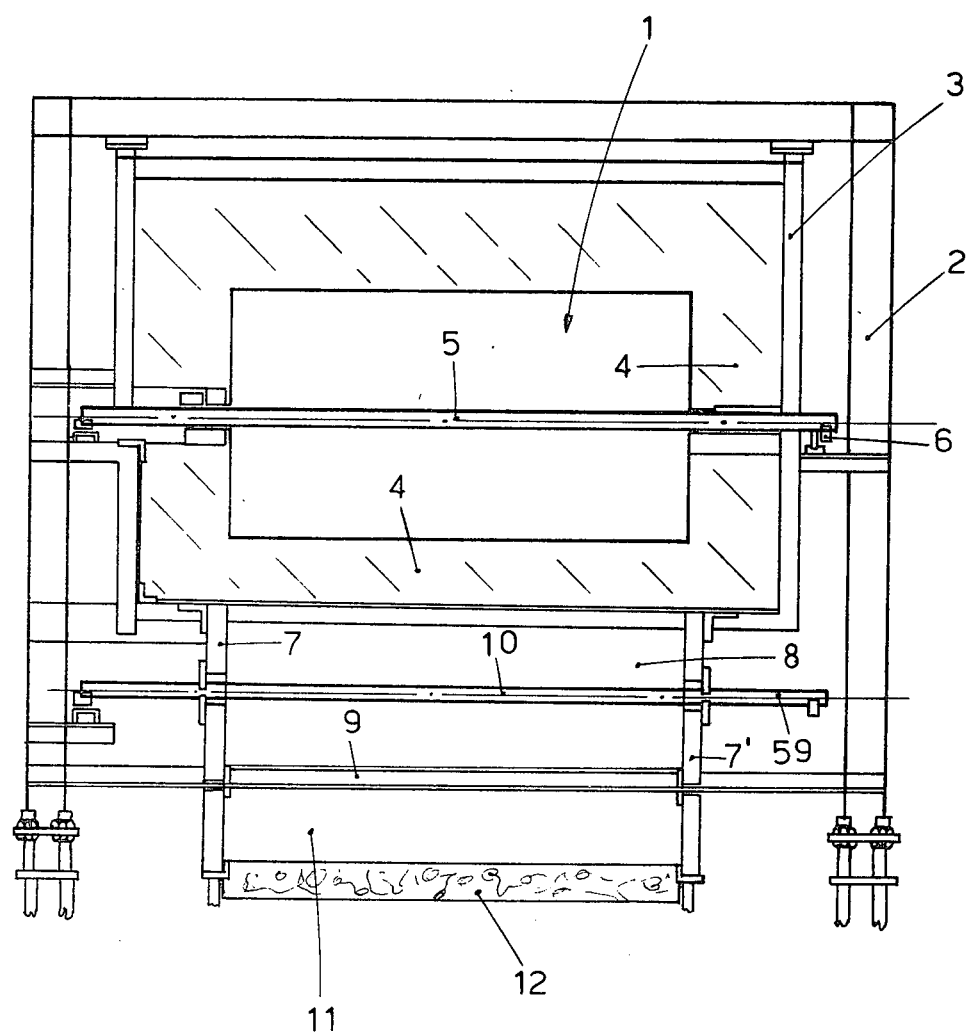
FIG. 1 is a diagrammatical cross-section view of the drying and firing kiln, object of the present invention.
Figure 2:
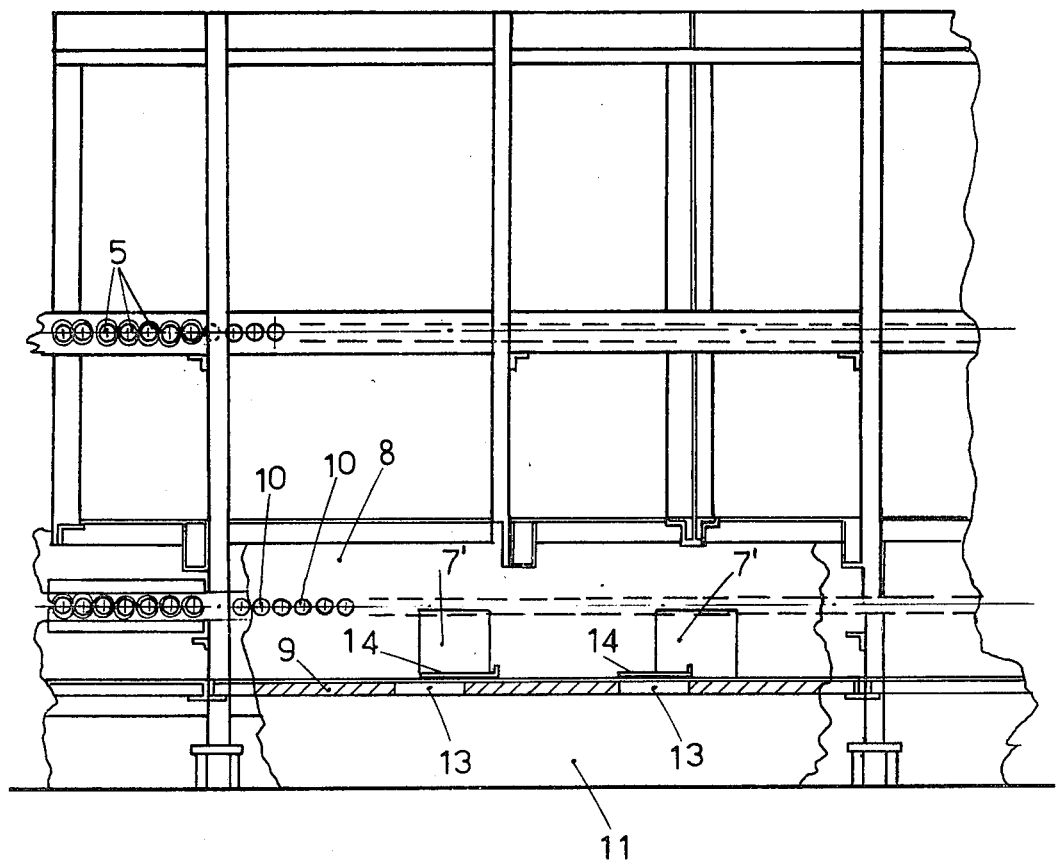
FIG. 2 is a partial longitudinal section view of a portion of the same kiln.

With reference to FIGS. 1 and 2, with the numeral 1 is indicated a roller kiln comprising an iron carrying structure 2, which supports the kiln firing tunnel at a certain height from the ground and a supporting structure 3 of the various parts of the kiln, such as the side walls, the crown and the sole. The kiln 1 is built according to the usual art of the roller kilns or according to the recentest arts and obviously is provided with the refractory and insulating wall structure 4 of an adequate thickness and of any suitable kind.

The progress plane of the material to be fired is constituted by a series of rollers 5, to be considered known, said rollers 5 being all parallel therebetween and transversally directed to the progress direction of the refractory and ceramic material to be fired. Each roller abuts, at least on a side, on paris of driving rollers 6, so as each of them is provided with a own rotation.

As usually the rollers 5 are constituted by refractory material.

Below the tunnel 1 is provided a second casing 7 generating a second tunnel 8 provided with walls and delimited upwardly by the insulating sole of the kiln and downwardly by a slab 9, said second tunnel being also provided with a progress plane constituted by singularly driven rollers 10.

Below the tunnel 8 and parallel thereto, there is a conduit 11, delimited laterally by an extension of the lateral walls of the tunnel 8 and upwardly by the slab 9, while downwardly is delimited by an insulating casting 12 provided on the ground.

Even though in FIGS. 1 and 2 as well as in FIGS. 3 and 4, which will be hereinafter described, the tunnel 8 and the conduit 11 have been indicated as positioned below the roller kiln 1, and even though this is the preferred embodiment as it allows not to increase the vertical encumbrance of the kiln or to increase it in a very insignificant way, it is also possible that the tunnel 8 and the conduit 11 are positioned above the kiln. Therefore what will be described afterward, can be valid for the embodiment indicated in figures, and for the embodiment providing the tunnel 8 and the conduit 11 disposed above the kiln 1.

The horizontal slab 9 separating the tunnel 8 from the conduit 11 is provided with communicating apertures 13 disposed at regular intervals, which can be closed by adjustable gates 14, which adjust for each aperture 13 the through gap from conduit 11 to tunnel 8. The access to gates 14, as well as the access to the interior of tunnel 8, is possible for example by means of removable panels 7' provided on the lateral walls 7.

The tunnel 1 is used to fire the ceramic or refractory materials and is destined to operate with very high temperatures, for example 1200°-1700° C. and therefore needs refractory walls considerably insulated, on the contrary the tunnel 8 is destined to operate with very reduced temperatures for example 150° to 250° C. and is provided to dry quickly the pressed material or the glazed biscuit.

Thanks to the reduced temperatures, the thickness and the insulation of the walls 7, as well as the slab 9, are of an insignificant importance, therefore such walls can be realized also with a material having a low cost. For the same reason the rollers 10 forming the progress plane can be common tubular iron rollers which, besides the low cost, have a great resistance and a long life.

The tunnel 8 extends at least as the kiln length and the material running through the tunnel 8 can be progressed according to the progress direction of the material into the kiln 1, or in the opposite direction to this material.

The drying tunnel 8, being incorporated in the kiln 1, can be heated employing the discharge gases coming from the kiln 1, which gases come out at such a temperature, so as they may form, in an excellent manner, the hot current running through the tunnel 8 for drying the materials.

In the executive example of FIGS. 3 and 3a it can be appreciated that a roller kiln for firing refractory material is composed by a prekiln 15, the proper kiln 16 comprising a first section, where the material is preheated and degassed, a second section which is subject to the proper firing temperature, a final section 17 where the fired material is subject to a forced cooling by means of the introduction of fresh air taken by the atmosphere by means of a fan 18 and the capacity of which is controlled by a gate 19, while this air heated through the contact of the re-hot material is sucked again by a fan 20 in order to be partly recycled toward the kiln through a conduit 21 or expelled to the atmosphere through an adjustable gate 22. The kiln is then completed by a natural cooling section 23, said section ends with a further forced cooling zone 24 by means of a fresh air jet sucked by the atmosphere through a fan 25 and directed to impinge on the material both above and under, so as the material is discharged in the direction of the arrow F.

In such kind of a kiln, it is also provided the drying tunnel 8 run by the material in the same direction of the firing path, that is according to the arrow F'.

In this case it is necessary to create a drying current of hot gases running through the tunnel 8 in the direction opposite to the material progress, the thermic contents of said hot gases directly deriving from the gas and the flue discharges coming from the kiln 1.

To this end at the entrance of the tunnel 8 is provided a fan 26 apt to create a depression and to suck the whole current running through the tunnel by means of a pipe 26' in order to discharge said current to the atmosphere. On the contrary, the hot gases are introduced into the conduit 11, so that they run through said conduit in a direction opposite to the gas flow in the tunnel 8 and are drawn by the conduit 11, through the gates 14, suitably distributed and adjusted.

To this end at the kiln exit is provided a device sucking from the closed end of the conduit 11, by means of a fan 29 and conveying the sucked gases directly into the conduit 8, thereby creating in the conduit 11 an end depression which assures the direction of the gas current. Said sucking device can be provided also to suck air from the atmosphere through a conduit 31 and simultaneously or alternatively to suck gases coming from the terminal cooler of the kiln 1. In said cooler, in fact, the coming out material is cooled by a strong air current sucked by the atmosphere by means of a fan 25 and impinging the material upwardly and downwardly relative to the progress plane. A discharge 30 can be employed in case the air capacity conveyed by the fan to the tunnel 8 is excessive.

The function of the device, which has, as a main component, the fan 29, as it can be seen in FIG. 3a, is not only to create a depression at the end of the conduit 11, but also to draw a considerable air flow that, besides to create a temperature lowering of the gases running through the conduit 8, in order to carry to the drying level, creates also a considerable gas flow assuring an optimum speed of the same gases along the tunnel 8 in order to obtain a quick drying without creating deterioration in the material. The speed of the drying gases is usually comprised in about 20–25 m/s.

The drawing of the hottest gases can be made on two zones, which are the most adequate to this end. A first zone is the section 17, wherein the very hot material comes out from the firing zone, is mixed with a fresh air current drawn by the atmosphere by means of a fan 18 and adjusted by a gate 19 so as to be distributed on the material in 18', so that the gas is considerably heated removing the heat from the material. The gas so heated is wholly sucked by an exhauster 20 incorporated in a device already known, equipped to distribute the drawn gas partly to a recycling conduit 21 and partly to a discharge controlled by a gate 22. In accordance with the present invention is provided an additional delivery pipe 27 through which the fan 20 can convey the hot gas into the conduit 11 through a suitable inlet 28. A series of hot gases 21' and 27' together with the gate 22 allow to control the hot gas quantities to be conveyed to the various employs.

A further drawing zone can be at the end of the prekiln 15, where it is already provided a known device 32 which draws the hot gases from the preheating zone of the kiln to convey them partly to the prekiln and partly through a by-pass 33, from which the gases are then sucked by a fan 34 to be discharged to the atmosphere through a chimney 35.

In accordance with the present invention, on the output of the fan 34 is inserted an inlet pipe 36 conveying the hot gases inside the conduit 11, a gate 35' being provided on the chimney 35 to adjust the hot gas quantity to introduce inside the conduit 11.

The provision of the conduit 11, which is fed by hot gases and the possibility to let into the tunnel 8 the hot gases through predetermined and adjustable positions allows to meter the inlet of the gases in the various positions in order to have a predetermined temperature diagram inside the same tunnel 8, which diagram can be varied at will, depending from the kind of the material to be dried.

In the embodiment example of FIGS. 4 and 4a there is provided that the materials to be dried run through the tunnel 8 in countercurrent relation relative to those running through the kiln 1, that is in the direction of the arrows F", which are directed in the direction opposite to the path arrows F of the kiln 1.

In this case the current of the drying gases has to be directed in the direction opposite to those of FIGS. 3 and 3a.

To this end the whole suction of the gas flow running through the tunnel 8 is accomplished by an exhauster 37, which sucks in correspondance with the outlet of the tunnel 8 through a conduit 30, so as to discharge in the atmosphere, thereby securing that the gas current running through the tunnel 8 is directed toward said outlet.

In this case the tunnel 11 is fed only by the gases drawn from the forced cooling zone 17, wherein the drawing device having the fan 20 as a main component, is not substantially modified.

On the contrary it is modified the device at the beginning of the prekiln 15, in the meaning that the conduit 36 instead of conveying the hot gases inside the conduit 11, conveys said gas directly into the tunnel 8. In this case, the possibility of drawing additional air being eliminated, as it takes place in case of FIG. 3a, through the conduit 31, said drawing will be accomplished by the fan 34 through the pipe 35 or through a pipe 39 controlled by the gate 39' and disposed on the device 32 and directly communicating with the atmosphere.

As previously described, in the drying tunnel 8, the progress plane of the material can be constituted not only by means of rollers 10, but alternatively by means of a continuous belt conveyor, which can be made of any material, as no difficulty exists owing to the limited operative temperature. The continuous belt conveyor, however, while having the advantage to be easier to mount, does not result to have a cost lesser than a roller plane and relative to the latter it presents the disadvantage that the material pieces which can be broken, are conveyed up to the outlet, so as it requires a continuous control. On the contrary, in the progress plane composed by rollers 10, the broken pieces fall on the ground and can be periodically removed through the windows closed by the panels 7'.

As above previously described, all the considerable advantages attainable by the present invention can be noted.

The most remarkable advantage is the considerable reduction of encumbrance as in the production line is eliminated the encumbrance due to the drier. On the contrary the encumbrance of the kiln drier unit, according to the invention, does not modify in any way the plan encumbrance of a normal roller kiln, and does not modify or modifies only in an insignificant manner the vertical encumbrance, as the drier occupies, at least partly, the space normally existing under the roller kiln, and the drier height, including the conduit 11, does not exceed 50–60 cm.

A second considerable advantage is given by the great energy saving, not only because is eliminated the heat source which was previously emploied to furnish heat to the self-contained drier, but also because the heat of the roller kiln which otherwise should be lost in the atmosphere, is recovered and emploied.

A further advantage is given by the fact that the kiln drier unit of the invention makes more flexible the production line into which is inserted, therefore said line can alternatively produce ceramic or refractory materials having different shape and thickness, as the roller or continuous conveyor drier, as well as the same roller kiln, does not constrain to a particular shape or thickness of the materials to be treated.

Another advantage is that the drier, as conceived, can be easily adjusted in order to produce dried material in accordance with the shifts of the production line, considering that the kiln has to continuously work.

Therefore in case of uninterrupted shifts, the drier can be adjusted so as to furnish in the time unit dried material equal to the material which has to be introduced in the firing kiln in the same time unit.

In case of intermittent shifts of the production line, the dried material quantity furnished is increased in order to produce a storage of the dried material, when the line is not in operation and to be fed to the firing tunnel 1.

The storage of the dried material is advantageous as said material results mechanically more resistant than the raw material not yet dried, so that not only it can be easily handled during the various displacements, but it can be stored after the glazing, considering that also this operation is intermittent as the production line, being a part of the latter.

A further considerable advantage is that the installation cost of the drier is remarkably reduced relative to the known driers, for the saving of the material, the elimination of a self-contained heating unit, the possibility to employ walls, structures, progress rollers or the like made of a less valuable and inexpensive material.

Although the preferred embodiments of this invention have been shown and described in detail, it is recognized that the invention is not limited to the precise form and structure shown and various modifications and rearrangements as will occur to those skilled in the art upon full comprehension of this invention may be resorted to without departing from the scope of the invention as defined in the claims.

I claim:

1. A roller tunnel kiln for firing a material to be advanced along a longitudinal axis of the kiln, comprising a first tunnel including a prekiln zone, a firing zone, a first forced cooling zone, and a second forced cooling zone and a plurality of refractory rotary rollers positioned transversely to said axis and constituting a progress plane for the material advanced along said rotary rollers; means for providing hot gases in said first tunnel, so that hot gases are flowing through said first tunnel; a second tunnel for drying the material and extending parallel to said first tunnel along the length thereof and thermally insulated therefrom, said second tunnel including a plurality of transversely positioned rotary rollers constituting a progress plane for the material to be dried and advanced along said rollers; means for introducing ambient air into said first tunnel; discharging means to withdraw a portion of the hot gases from said first tunnel; mixing means for mixing said portion of hot gases received from said first tunnel with a portion of ambient air received from said ambient air introducing means; and means for communicating said mixing means with said second tunnel and adapted to form a current of hot gases at drying temperatures passing through said second tunnel in a direction opposite to that of the material to be dried.

2. The roller kiln of claim 1, wherein said discharging means are connected to said prekiln zone to receive hot gases therefrom.

3. The roller tunnel kiln of claim 2, wherein said discharging means include a second fan to remove the hot gases from said prekiln zone.

4. The roller tunnel kiln of claim 2, wherein said discharging means are connected to said second forced cooling zone to receive heated gases obtained in heat exchange with the material to be cooled.

5. The roller tunnel kiln of claim 4, wherein said discharging means include a third fan to remove the gases heated in heat exchange with the material to be cooled in said second forced cooling zone.

6. The roller tunnel kiln of claim 5, further comprising fan means disposed between said distributing tunnel and said second tunnel to generate a pressure in said second tunnel sufficient to obtain the desired current of hot gases running in a direction opposite to that of the material to be dried.

7. The roller tunnel kiln of claim 2, wherein said discharging means are further connected to said first forced cooling zone to receive therefrom hot gases being heated in heat exchange with the material to be cooled in said first forced cooling zone.

8. The roller tunnel kiln of claim 7, further comprising a third distributing tunnel extending parallel to said second tunnel along the length thereof, being separated therefrom by a wall, and arranged in communication therewith; connecting means associated with said distributing tunnel, said connecting means being a portion of said communicating means to connect said mixing means to said distributing tunnel whereby hot gases at drying temperatures are passing from said mixing means through said connecting means.

9. The roller tunnel kiln of claim 8, wherein said second tunnel and said distributing tunnel are located above said first tunnel.

10. The roller tunnel kiln of claim 8, wherein said second tunnel and said distributing tunnel are located below said first tunnel.

11. The roller tunnel kiln of claim 8, wherein said discharging means include a first fan to remove the heated gases from said first forced cooling zone.

12. The roller tunnel kiln of claim 11, further comprising control means connected to said mixing means to control the amount of gases introduced into said distributing tunnel.

13. The roller tunnel kiln of claim 10, wherein said distributing tunnel is located between said second tunnel and an insulating sole of the kiln disposed on the ground.

14. The roller tunnel kiln of claim 8, wherein a plurality of spaced apertures are provided in said wall to thereby adequately distribute said hot gases at drying temperatures along the length of said second tunnel.

15. The roller kiln of claim 14, wherein said apertures are arranged with gates adapted to partially close said apertures to thereby adjust the amount of said hot gases at second temperatures running from said distributing tunnel to said drying tunnel due to the material to be dried.

16. The roller tunnel kiln of claim 12, further comprising recycling means connected to said first fan to partially direct the heated gases to said first tunnel.

17. The roller tunnel kiln of claim 16, further comprising a natural cooling zone located between said first forced cooling zone and said second forced cooling zone.

18. The roller tunnel kiln of claim 1, wherein said rollers in said tunnel and said first rollers in said second tunnel are singularly driven.

19. The roller tunnel kiln of claim 1, wherein said progress plane in said second tunnel is formed by a continuous conveyor.

* * * * *